US012687768B2

(12) United States Patent
Meng

(10) Patent No.: US 12,687,768 B2
(45) Date of Patent: Jul. 21, 2026

(54) CRUSHABLE LENS ADAPTER RING

(71) Applicant: Chiang-Hung Lin, New Taipei City (TW)

(72) Inventor: Tien-Pei Meng, Taipei City (TW)

(73) Assignee: Tien-Pei Meng, Taipei City (TW)

( * ) Notice: Subject to any disclaimer, the term of this patent is extended or adjusted under 35 U.S.C. 154(b) by 225 days.

(21) Appl. No.: 18/676,427

(22) Filed: May 28, 2024

(65) Prior Publication Data

US 2024/0427222 A1    Dec. 26, 2024

(30) Foreign Application Priority Data

Jun. 13, 2023    (TW) ................................ 112121993

(51) Int. Cl.
 *G03B 17/56* (2021.01)
 *G02B 7/00* (2021.01)
 *G02B 7/02* (2021.01)
 *G03B 11/00* (2021.01)

(52) U.S. Cl.
 CPC .......... *G03B 17/566* (2013.01); *G02B 7/006* (2013.01); *G02B 7/026* (2013.01); *G03B 11/00* (2013.01)

(58) Field of Classification Search
 CPC .... G03B 17/566; G03B 17/565; G03B 11/00; G02B 7/026; G02B 7/006
 See application file for complete search history.

(56) References Cited

U.S. PATENT DOCUMENTS

| 5,528,328 | A | * | 6/1996 | O'Farrill | ................ | G03B 11/00 |
| | | | | | | 396/544 |
| 2006/0098307 | A1 | * | 5/2006 | Campean | ............... | G02B 23/16 |
| | | | | | | 359/819 |
| 2008/0205881 | A1 | * | 8/2008 | Sakurai | .................. | G03B 17/14 |
| | | | | | | 396/530 |
| 2013/0265664 | A1 | * | 10/2013 | Linuma | .................. | G03B 17/48 |
| | | | | | | 359/828 |
| 2014/0140688 | A1 | * | 5/2014 | Xu | ......................... | G02B 7/006 |
| | | | | | | 396/544 |
| 2018/0210324 | A1 | | 7/2018 | Harden | | |
| 2019/0166962 | A1 | | 6/2019 | Stephens | | |
| 2023/0176450 | A1 | * | 6/2023 | Meng | ..................... | G03B 17/14 |
| | | | | | | 396/544 |

(Continued)

FOREIGN PATENT DOCUMENTS

| CN | | 103365043 A | | 10/2013 |
| CN | | 105629638 A | | 6/2016 |
| CN | | 208903060 U | * | 5/2019 |

(Continued)

*Primary Examiner* — Jia X Pan
(74) *Attorney, Agent, or Firm* — Workman Nydegger

(57) ABSTRACT

A crushable lens adapter ring includes a frame. The outer wall surface of one end of the frame has a first connecting portion for being connected to a first lens having a first diameter. The inner wall surface of the other end of the frame has a second connecting portion for being connected to a second lens having a second diameter. The frame has at least one force application portion and at least one crushable portion. At least a portion of the force application portion is adjacent to the crushable portion. When the force application portion is subjected to a force and displaced in a direction, the force application portion can force the frame to be broken and torn along the extension direction of the crushable portion.

14 Claims, 22 Drawing Sheets

(56) References Cited

U.S. PATENT DOCUMENTS

2025/0328061 A1 *  10/2025  Yao ........................ G03B 17/14

FOREIGN PATENT DOCUMENTS

| CN | 210005768 | U | 1/2020 |
| CN | 115437197 | A | 12/2022 |
| JP | R01-2019105704 | A | 6/2019 |
| TW | M642268 | U | 6/2023 |

* cited by examiner

CRUSHABLE LENS ADAPTER RING

CROSS-REFERENCE TO RELATED PATENT APPLICATION

This non-provisional application claims priority to and the benefit of, under 35 U.S.C. § 119(a), Taiwan Patent Application No. 112121993, filed Jun. 13, 2023 in Taiwan. The entire content of the above identified application is incorporated herein by reference.

FIELD

The present disclosure is related to a lens adapter ring, and more particularly to a crushable lens adapter ring with a reduced frame thickness and crushable by an external force.

BACKGROUND

With the rapid development of digital technology and optical technology, various digital products have not only improved in terms of efficacy and performance, but also have gradually popularized as their prices decrease. Generally speaking, when photographing with a camera, in order to obtain different image effects, users usually attach filters with different effects (e.g., soft focus filters, star filters, polarizers, neutral-density filters, various color filters, etc.) on camera lenses. Or, in order to protect camera lenses or the aforementioned filters, a user would attach a separate protective lens on the camera lens or filters.

Even though with the advancement of various image processing software, many of the above-referenced filters have gradually been replaced by powerful digital technology, polarizers, neutral-density filters and protective lenses are still very difficult to replace. As suggested by its name, a neutral-density filter is a filter that reduces the light transmission rate, and in general, can be sorted into several different specifications according to the light transmission rate. According to the actual needs of photographing, a consumer can install a single neutral-density filter or multiple neutral-density filters of different specifications on a lens, thereby appropriately reducing the amount of light passing through the lens, so that photographing in an environment with relatively stronger light can be performed. A polarizer is a filter made according to the polarization principle of light. When rotated, a polarizer can adjust the amount of light passing through a specific polarization angle. When a consumer installs a polarizer on a lens and adjusts the angle of the polarizer appropriately, the reflection on the surface of an object (such as the surface of water, window glass or the surface of plant leaves) can be effectively eliminated, and ideal photographing effects can be obtained. A protective lens is used to protect a camera lens, a polarizer or a neutral-density filter, so as to prevent the camera lens, polarizer or neutral-density filter from being scratched by external dust (such as quartz sands) or damaged by impact.

However, due to differences in brand or specification design, different camera lenses, filter lenses, or protective lenses have different diameters. In order to connect to lenses of different lens diameters, adapter rings are generally used as a connection medium so that a user does not have to additionally buy filter lenses or protective lenses corresponding to a camera lens, so as to reduce the purchase cost of photographic equipment and the storing space taken by such.

However, when connecting with a filter lens or protective lens having an external thread or screw thread, a conventional adapter ring often engages improperly. For example, if the yield of the internal thread of an adapter ring is not good, a filter lens or protective lens screwed into the adapter ring can get stuck. In that case, if breaking the adapter ring with an external force, as affected by the material and thickness (about 2 mm) of the adapter ring, not only is it difficult to apply an appropriate force precisely, but also the filter lens or protective lens can be indirectly damaged. Accordingly, how to resolve the aforesaid problems effectively to allow an adapter ring to be broken more easily is one of the important issues to be addressed in the present disclosure.

SUMMARY

In view of the above-referenced conventional problems, as a result of repeated research and testing, a crushable lens adapter ring is provided in the present disclosure, so as to effectively resolve the conventional problems, and provide manufacturers and/or installation personnel with better operation and/or use experience.

Certain aspects of the present disclosure are directed to a crushable lens adapter ring. The crushable lens adapter ring includes a frame. The frame has a first end, a second end, at least one crushable portion, and at least one force application portion. The outer wall surface of the first end has a first connecting portion for being connected to a first lens having a first diameter. The inner wall surface of the second end has a second connecting portion for being connected to a second lens having a second diameter. The at least one force application portion has at least one portion adjacent to at least one portion of the at least one crushable portion. The at least one force application portion is configured to, when subjected to a force and displaced in a direction, force the frame to be broken and torn along the extension direction of the at least one crushable portion.

In certain embodiments, the at least one crushable portion extends along the axial direction of the frame.

In certain embodiments, the at least one crushable portion extends along the circumferential direction of the frame.

In certain embodiments, the at least one crushable portion is shaped as a groove and concavely formed at the outer wall surface or the inner wall surface of the frame.

In certain embodiments, the at least one crushable portion includes a plurality of holes.

In certain embodiments, the outer diameter of the second end is greater than the outer diameter of the first end so as to form a shoulder portion between the first end and the second end, the outer side of the shoulder portion has an inclined surface, and the inclined surface slopes in a direction from the second end to the first end so that a portion of the shoulder portion that corresponds to an area where two inner wall surfaces of the second end are joined forms the at least one crushable portion.

In certain embodiments, the minimal thickness of the at least one crushable portion is 0.1 mm to 0.3 mm.

In certain embodiments, the frame further has at least one auxiliary crushable portion adjacent to the at least one crushable portion.

In certain embodiments, the at least one force application portion is protrudingly provided on the outer wall surface of the frame.

In certain embodiments, the at least one force application portion includes a through opening and an inclined force application surface, and the opening diameter of the through opening on the outer wall surface of the frame is less than the opening diameter of the through opening on the inner wall surface of the frame so as to form the inclined force application surface.

In certain embodiments, the at least one force application portion is an internally threaded groove or a threaded hole.

In certain embodiments, the frame is made of a metal material or a fiber-reinforced plastic material.

In certain embodiments, the at least one force application portion includes at least one sunken area, and the sunken area is adjacent to or in communication with the at least one crushable portion.

In certain embodiments, the at least one sunken area is located at at least one of the outer wall surface and the inner wall surface of the frame.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
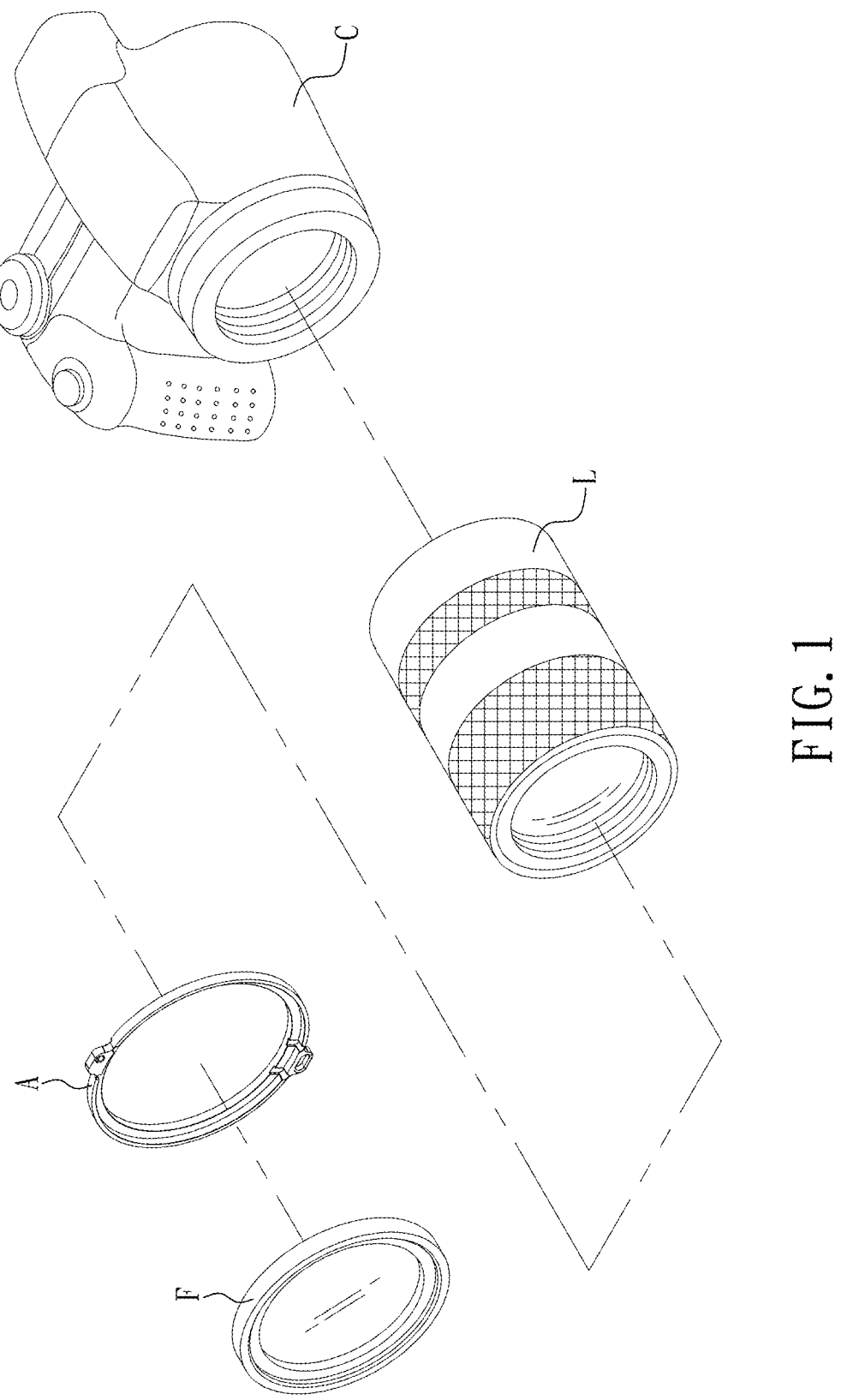
FIG. 1 is an exploded view of a crushable lens adapter ring, a camera, a first lens and a second lens according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As used herein, a numeral value referred in the present disclosure can include a value, or an average of values, in an acceptable deviation range of a particular value recognized or decided by a person of ordinary skill in the art, taking into account any specific quantity of errors related to the measurement of the value that may resulted from limitations of a measurement system or device. For example, a particular numeral value referred in the embodiments of the present disclosure can include ±5%, ±3%, ±1%, ±0.5% or ±0.1%, or one or more standard deviations, of the particular numeral value.

Figure 2:
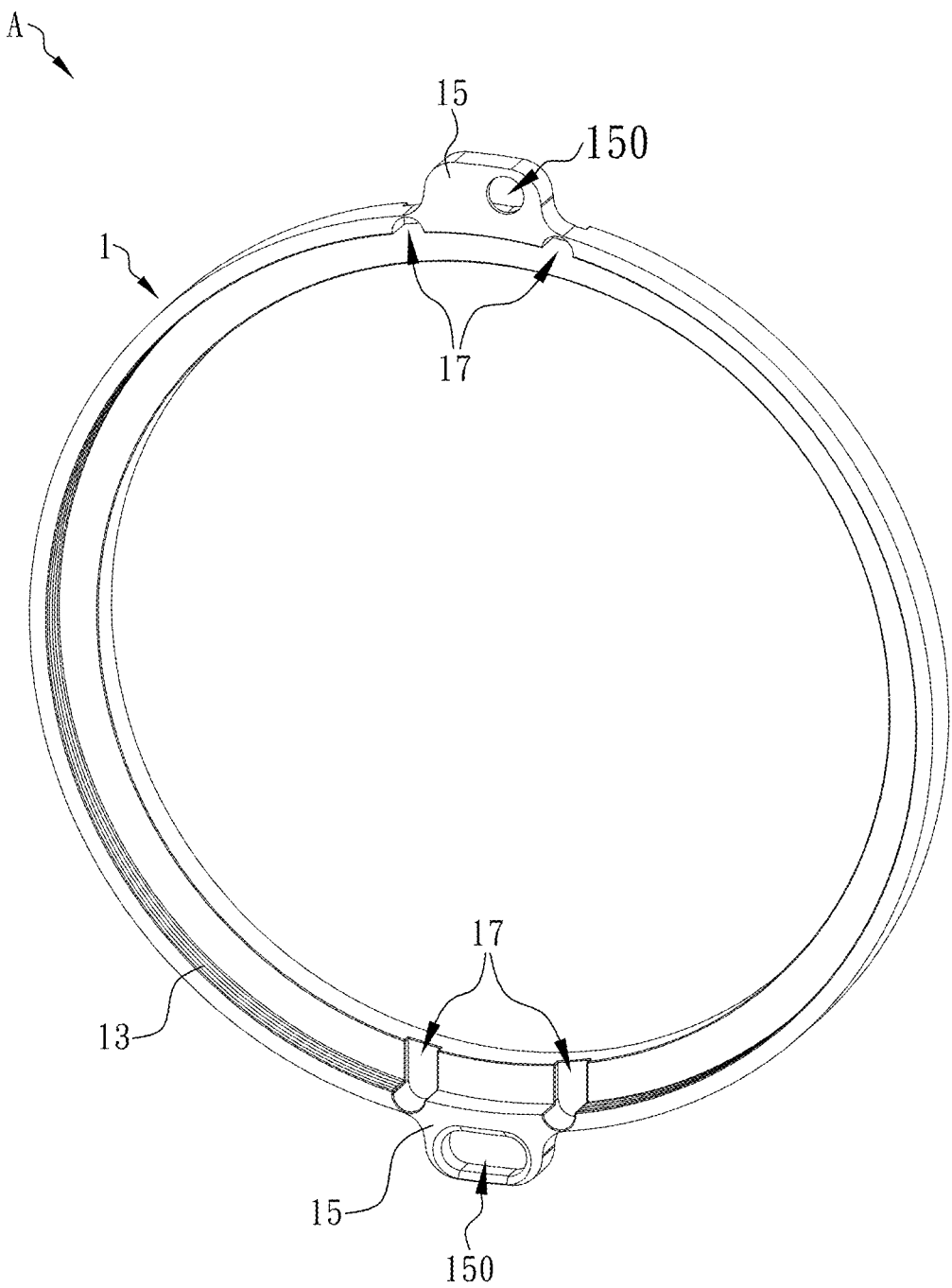
FIG. 2 is a perspective front view of a crushable lens adapter ring according to certain embodiments of the present disclosure.
Figure 3A:
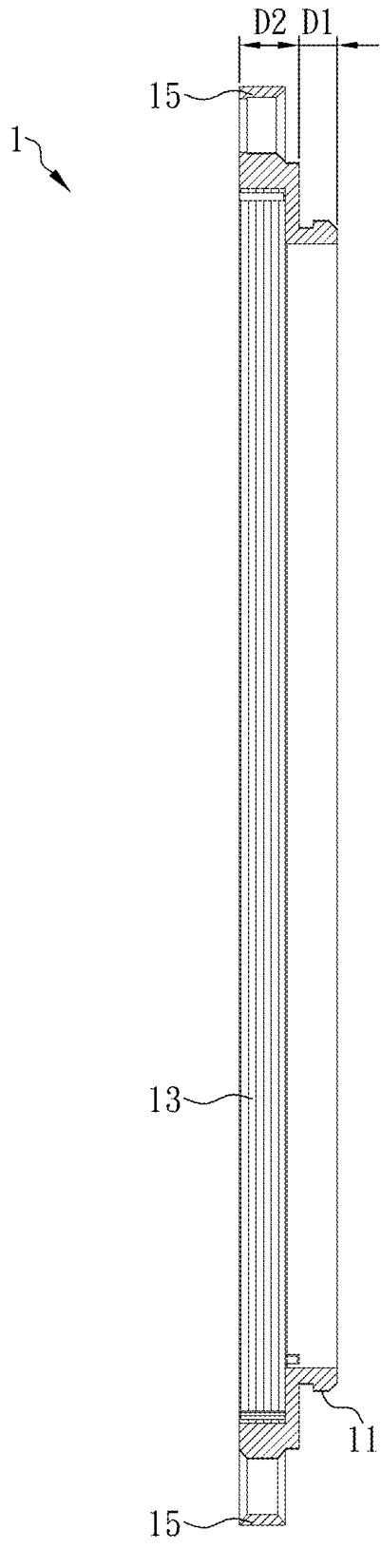
FIG. 3A is a cross-section side view of a crushable lens adapter ring according to certain embodiments of the present disclosure.
Figure 3B:
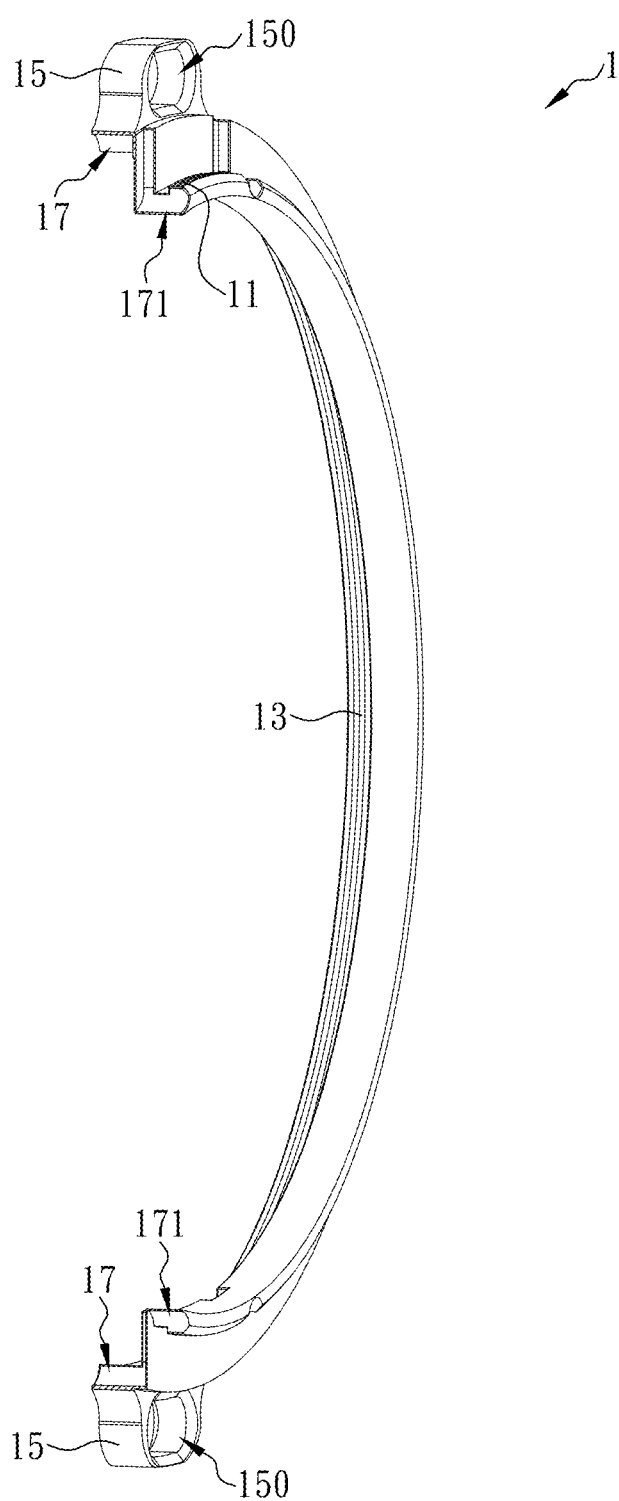
FIG. 3B is a perspective cross-section side view of a crushable lens adapter ring according to certain embodiments of the present disclosure.

Certain aspects of the present disclosure are directed to a crushable lens adapter ring A applicable to a camera C. In certain embodiments, referring to FIG. 1, the crushable lens adapter ring A is used to connect a first lens L and a second lens F that have different lens diameters from each other. Referring to FIG. 2, the crushable lens adapter ring A includes a frame 1. The frame 1 is made of a metal material (e.g., an aluminum alloy) or a fiber-reinforced plastic material (but not limited thereto), and is generally in the shape of a hollow ring. To facilitate description, in the present disclosure below, the lower left of FIG. 2 is defined as the front side of an element, the upper right of FIG. 2 is defined as the rear side of an element, the top side of FIG. 2 is defined as the upper (top) side of an element, the bottom side of FIG. 2 is defined as the lower (bottom) side of an element. In addition, the configurations of the crushable lens adapter ring A in the present disclosure are not limited to those depicted in the drawings of the present disclosure. A manufacturer can, based on product needs, adjust the appearance and shape of the crushable lens adapter ring A. Accordingly, as long as a crushable lens adapter ring has the relevant basic structure and effects in any embodiment infra, it falls in the scope of the crushable lens adapter ring A defined in the present disclosure.

Referring to FIG. 1 to FIG. 3B, when seen in side view, the two opposite ends of the frame 1 have different outer diameters and are a first adapter end D1 and a second adapter end D2. The first adapter end D1 is located at one end (e.g., the rear end) of the frame 1 and matches the first lens diameter of the first lens L. The outer wall surface of the first adapter end D1 has a first connecting portion 11 (e.g., an external thread) in order to be connected to the first lens L. (e.g., any of a variety of lenses such as a wide-angle lens, a telephoto lens, a fixed-focus lens, a zoom lens, etc.; or any of a variety of functional lenses such as a protective lens, a polarizer lens, a filter, etc.) through the first connecting portion 11. The second adapter end D2 is located at the other end (e.g., the front end) of the frame 1 and matches the second lens diameter of the second lens F. The inner wall surface of the second adapter end D2 has a second connecting portion 13 (e.g., an internal thread) so as to be connected to the second lens F through the second connecting portion 13. In certain embodiments, the inner diameter of the second adapter end D2 is greater than the outer diameter of the first adapter end D1, which is equivalent to the second lens diameter being greater than the first lens diameter. However, the present disclosure is not limited thereto. In certain embodiments, depending on actual product requirements, the first connecting portion 11 and the second connecting portion 13 can adopt other fixing structures and are not limited to the configuration of threads.

Figure 4:
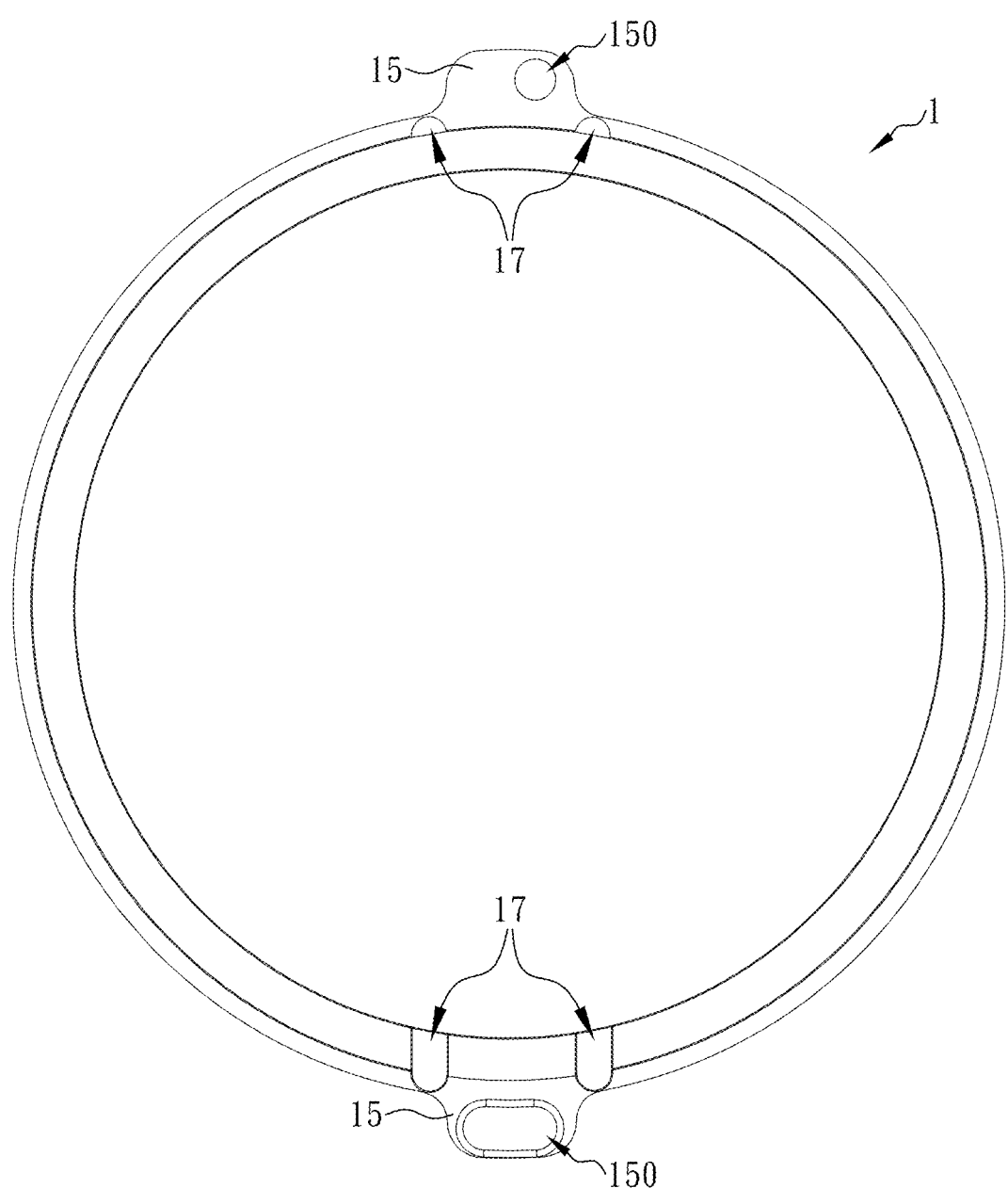
FIG. 4 is a front view of a crushable lens adapter ring according to certain embodiments of the present disclosure.
Figure 5:
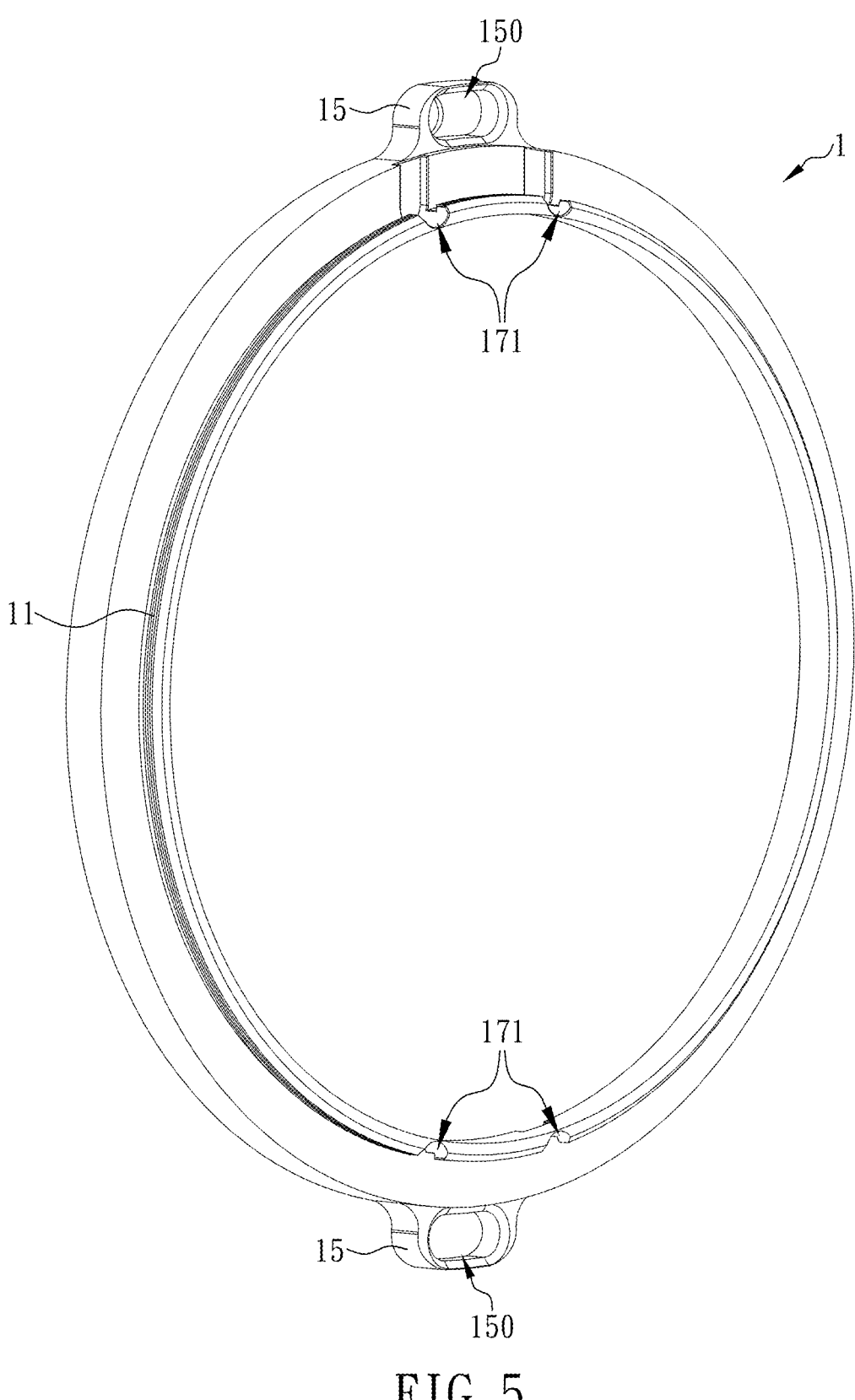
FIG. 5 is a perspective rear view of a crushable lens adapter ring according to certain embodiments of the present disclosure.
Figure 6:
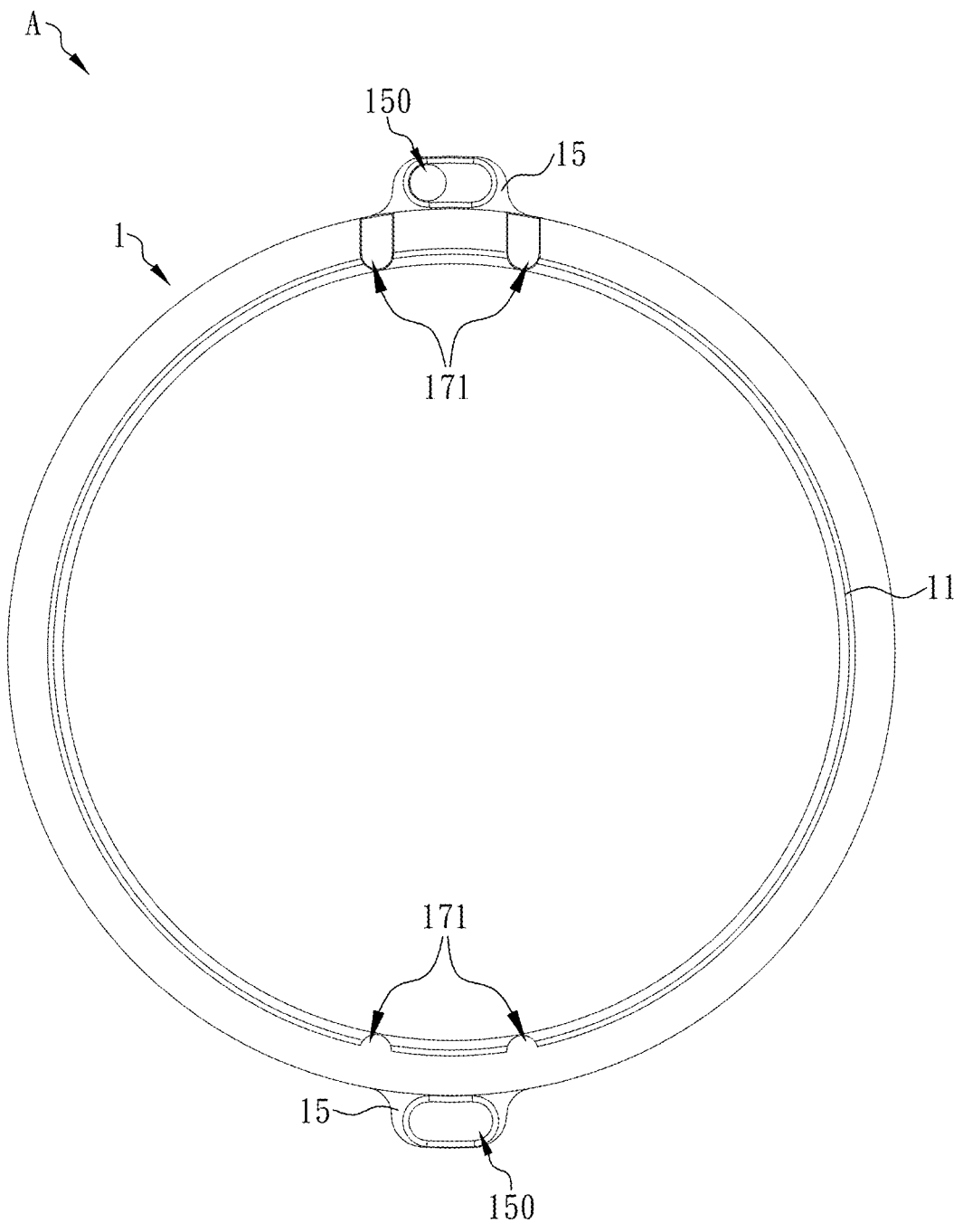
FIG. 6 is a rear view of a crushable lens adapter ring according to certain embodiments of the present disclosure.

Referring to FIG. 2 to FIG. 6, in certain embodiments, the frame 1 has a plurality of force application portions 15 and a plurality of crushable portions 17. The force application portions 15 extend outward from the outer wall surface of the frame 1. Referring to FIG. 4, the force application portion 15 on top of the frame 1 is protrudingly provided and extends upward, and the force application portion 15 at the bottom of the frame 1 is protrudingly provided and extends downward. Each of the force application portions 15 has a through hole 150. A user can pinch the force application portion 15 barehanded or insert a removal tool (e.g., a hairpin, a key, a bamboo stick, etc.) into the through hole 150 and apply a force to the force application portion 15. In certain embodiments, the force application portions 15 are integrally formed with the frame 1. However, the present disclosure is not limited thereto. In certain embodiments, the force application portions 15 can be independent elements, and be fixed to the frame 1 by a method such as soldering, adhesive bonding, riveting, mechanical engagement, threaded connection, etc. As long as a force application portion can allow a user to apply a force to it, thereby deforming and breaking a crushable portion 17 as described below, it falls within the scope of the force application portion(s) 15 defined in the present disclosure. In addition, the size and shape of the through holes 150 can be adjusted according to actual product requirements, and when the frame 1 has a plurality of force application portions 15, the through holes 150 of the force application portions 15 can have the same configuration or different configurations. One or more force application portions 15 can even dispense with the through hole(s) 150, and a user can pinch such a force application portion 15 directly with fingers or clampingly hold the force application portion 15 with a removal tool (e.g., a wrench) and apply a force to the force application portion 15.

Referring to FIG. 2 to FIG. 6, the crushable portions 17 are located at the frame 1, and the areas where they are located are deliberately designed to have a smaller thickness than the main body of the frame 1. It is noted that the afore-referenced "main body of the frame 1" refers to the core and basic structural portion of the frame 1 and does not include any additional, functional, or decorative portion, such as a thread, an anti-slip pattern, etc., and that the main body of the frame 1 generally has a thicker and stronger structure in order to provide sufficient strength and stability, enabling normal use of the crushable lens adapter ring A. Also, the crushable portions 17 can be adjacent to the force application portions 15 so that when a force application portion 15 is subjected to an applied force and displaced in a direction, the afore-referenced force will be transmitted to the main body of the frame 1. As a crushable portion 17 has a smaller thickness and therefore a lower structural strength, its force-bearing ability is lower than that of the other portions of the frame 1. The crushable portion(s) 17 will reach the bearing limit first and start to deform and break. The deformation and breakage will cause more force to be concentrated in the areas where the crushable portions 17 are located, thereby aggravating the deformation and breakage of the crushable portion(s) 17 such that the frame 1 is broken and torn along the extension direction(s) of the crushable portion(s) 17. It is noted that the term "adjacent" in the present disclosure can refer to the positional closeness between two structural features that when one of the structural features is subjected to an applied force, the closeness is sufficient for the force to be transmitted to the other structural feature for it to be also affected. A person of ordinary skill in the art would be able to understand the term "adjacent" easily and unambiguously through the contents and the drawings of the present disclosure. In certain preferred embodiments, the term "adjacent" may refer to a case in which the shortest distance between two structural features in a three-dimensional space is within 5 mm.

Referring to FIG. 2 to FIG. 6, in certain embodiments, the crushable portions 17 extend along the front-rear direction (i.e., axial direction) of the frame 1. The crushable portions 17 can be concavely formed at the inner wall surface of the second adapter end D2. In certain embodiments, the crushable portions 17 can be located only at an inner wall surface position of the frame 1 that has the second connecting portion 13 (such as the upper crushable portions 17 in FIG. 2 and FIG. 4). In certain embodiments, the crushable portions 17 can be located at an inner wall surface position of the frame 1 that has the second connecting portion 13 and at an inner wall surface position that does not have the second connecting portion 13 (such as the lower crushable portions 17 in FIG. 2 and FIG. 4). The term "inner wall surface position that does not have the second connecting portion 13" refers to the shoulder portion formed of the area connecting the second adapter end D2 and the first adapter end D1. In addition, the crushable portion 17 can be shaped as a curved groove, and its thinnest portion can be 0.1 mm to 0.3 mm (but not limited thereto).

To make the frame 1 more breakable, referring to FIG. 2 to FIG. 6, in certain embodiments, the frame 1 further has at least one auxiliary crushable portion 171. The auxiliary crushable portion 171 can be concavely formed at the outer wall surface of the first adapter end D1 and substantially correspond in position to, and be located on the opposite side of, a crushable portion 17. When a user pushes a force application portion 15, the force applied can make the frame 1 deform and break along the crushable portion 17 and the auxiliary crushable portion 171. In certain embodiments, the auxiliary crushable portion 171 can be located only at an outer wall surface position of the frame 1 that has the first connecting portion 11 (such as the lower auxiliary crushable portions 17 in FIG. 5 and FIG. 6). In certain embodiments, the auxiliary crushable portion 171 can be located at an outer wall surface position of the frame 1 that has the first connecting portion 11 and at an outer wall surface position that does not have the first connecting portion 11 (such as the upper auxiliary crushable portions 17 in FIG. 5 and FIG. 6). The term "outer wall surface position that does not have the first connecting portion 11" refers to the shoulder portion formed of the area connecting the first adapter end D1 and the second adapter end D2. In addition, the auxiliary crushable portion 17 can be shaped as a curved groove, and its thinnest portion can be 0.1 mm to 0.3 mm (but not limited thereto).

In addition, referring to FIG. 2 to FIG. 6, in certain embodiments, the frame 1 has a plurality of force application portions 15, crushable portions 17, and auxiliary crushable portions 171. However, the present disclosure is not limited thereto. In certain embodiments, the frame 1 can, according to product requirements, have the number of the force application portion(s) 15, the number of the crushable portion(s) 17, and the number of the auxiliary crushable portion(s) 171 arbitrarily adjusted, and each of the aforesaid numbers can be at least one. Or, the frame 1 can have only the force application portion(s) 15 and the crushable portion(s) 17. Moreover, the configuration of the crushable portion(s) 17 and the auxiliary crushable portion(s) 171 can be both being provided at the frame 1, or only the crushable portion(s) 17 or the auxiliary crushable portion(s) 171 being provided at the frame 1, so as to increase the flexibility in production of the crushable lens adapter ring A.

Referring to FIG. 1 to FIG. 6, if the crushable lens adapter ring A is to be threadedly connected to the second lens F, but a wrong mounting position (angle), poor thread quality, the grime in the gap between threads, or other problems cause improper engagement such that the threads of the crushable lens adapter ring A and of the second lens F are caught by each other (also known as the threads getting stuck), a user can apply a force to the force application portion(s) 15 barehanded or with a removal tool, so that the frame 1 is broken and torn along the extension direction(s) of the crushable portion(s) 17. In this way, the frame 1 will be deformed because it is broken. The deformation often causes the two end points corresponding to the broken portion of the frame 1 to move away from each other, damaging the circularity of the crushable lens adapter ring A. and the user can subsequently apply a force directly to the frame 1, thereby removing the crushable lens adapter ring A from the second lens F easily, without causing damage to the second lens F. Furthermore, although this disengagement method will make the crushable lens adapter ring A unable to be reused, the crushable lens adapter ring A generally has a far lower price than the second lens F (e.g., a polarizer or a neutral-density filter) and therefore can be viewed as a consumable.

The following describes various other configurations of the crushable lens adapter ring A, and only the major differences from the foregoing embodiments will be described. In certain embodiments, referring to FIG. 7 and FIG. 8, the frame 1 is provided with two force application portions 25, two crushable portions 27, and an auxiliary crushable portion 271. Each of the force application portions 25 is located at the outer wall surface of the second adapter end D2 of the frame 1 and has a through hole 250 thereon (but not limited thereto). Each of the crushable portions 27 is located at the inner wall surface of the second adapter end D2 and is adjacent to a force application portion 25. Further, the auxiliary crushable portion 271 is located at the area connecting the first adapter end D1 and the second adapter end D2 and extends along the circumferential direction of the frame 1. At least one end of the auxiliary crushable portion 271 can be adjacent to or connected to the crushable portion(s) 27. In certain embodiments, the cross-sectional configuration of the auxiliary crushable portion 271 can be a V-shaped groove (but not limited thereto). When a user applies a force to the force application portion(s) 25 barehanded or with a removal tool, the crushable portion(s) 27 will be deformed and broken along the axial direction of the frame 1, and then the auxiliary crushable portion 271 will be deformed and broken along the circumferential direction of the frame 1 such that the frame 1 is broken and torn.

Figure 7:
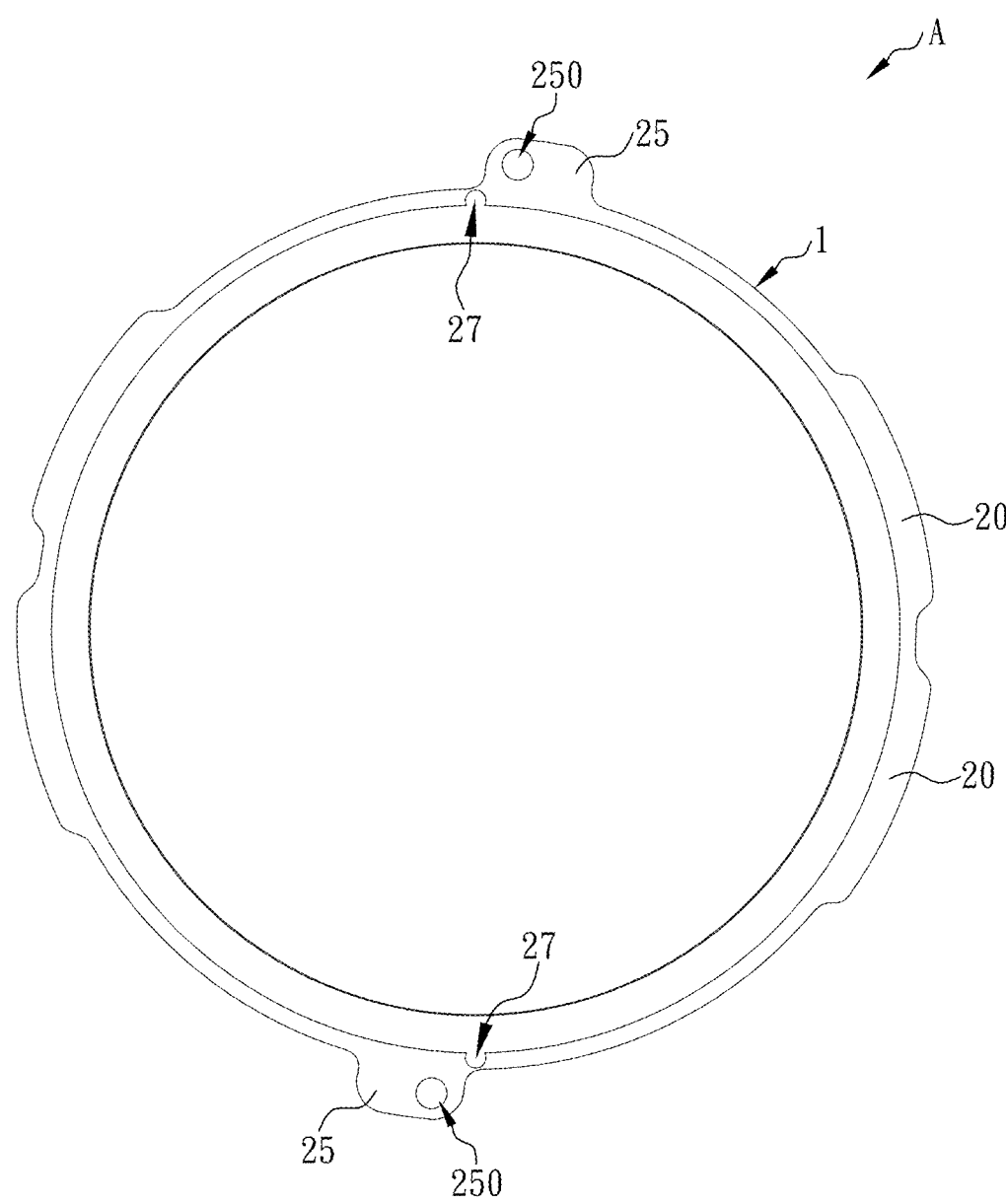
FIG. 7 is a perspective front view of a crushable lens adapter ring according to certain embodiments of the present disclosure.
Figure 8:
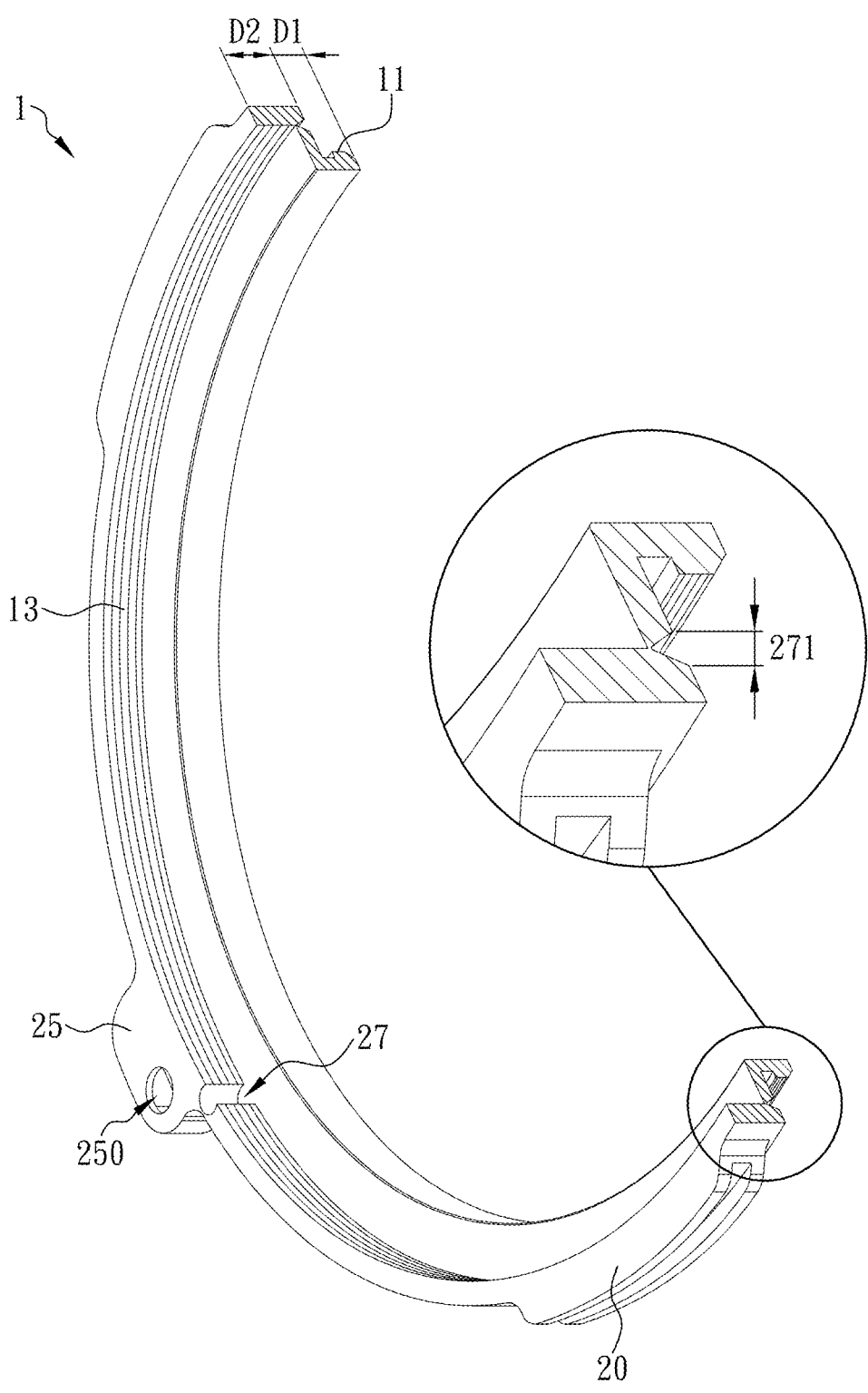
FIG. 8 is a perspective cross-section side view of a crushable lens adapter ring according to certain embodiments of the present disclosure.
Figure 9:
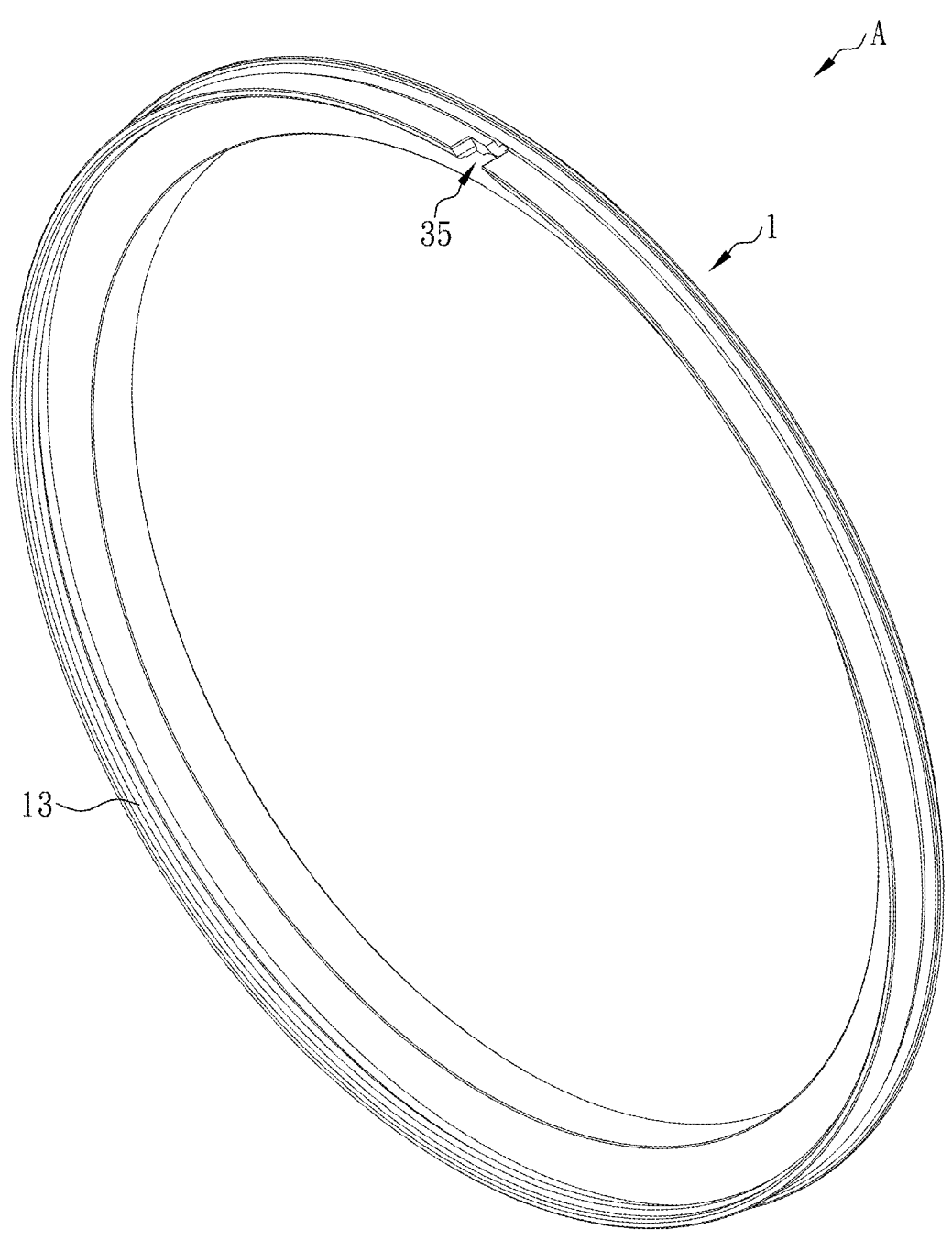
FIG. 9 is a perspective front view of a crushable lens adapter ring according to certain embodiments of the present disclosure.
Figure 10:
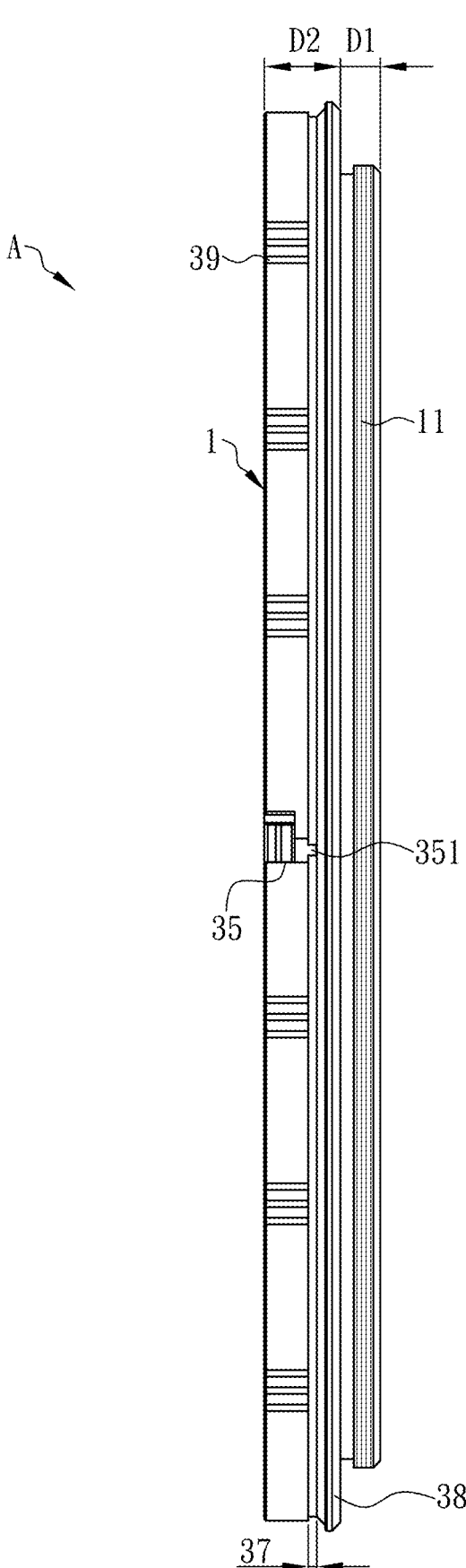
FIG. 10 is a side view of a crushable lens adapter ring according to certain embodiments of the present disclosure.
Figure 11A:
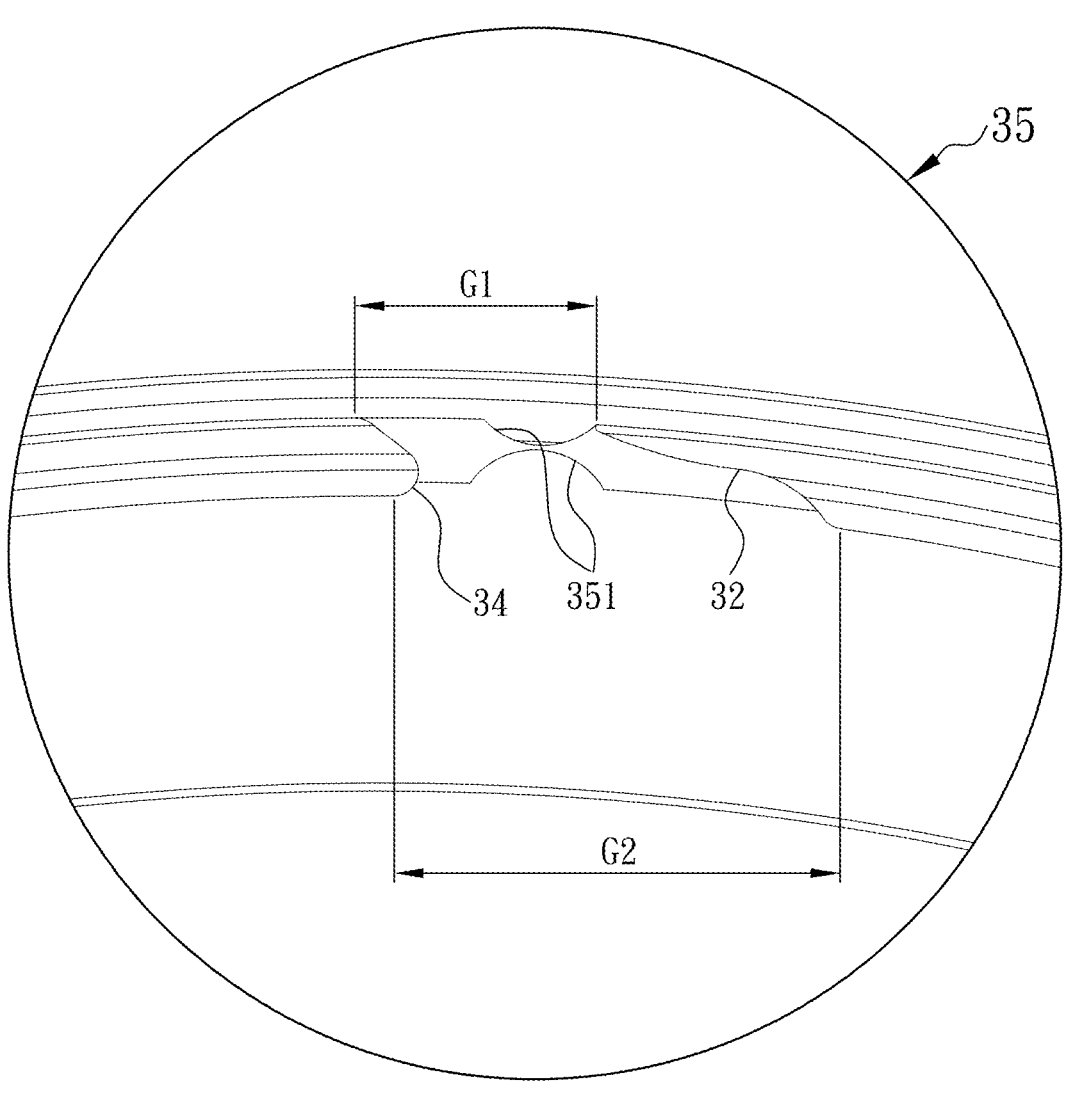
FIG. 11A is a partially enlarged view of a force application portion from an angle according to certain embodiments of the present disclosure.
Figure 11B:
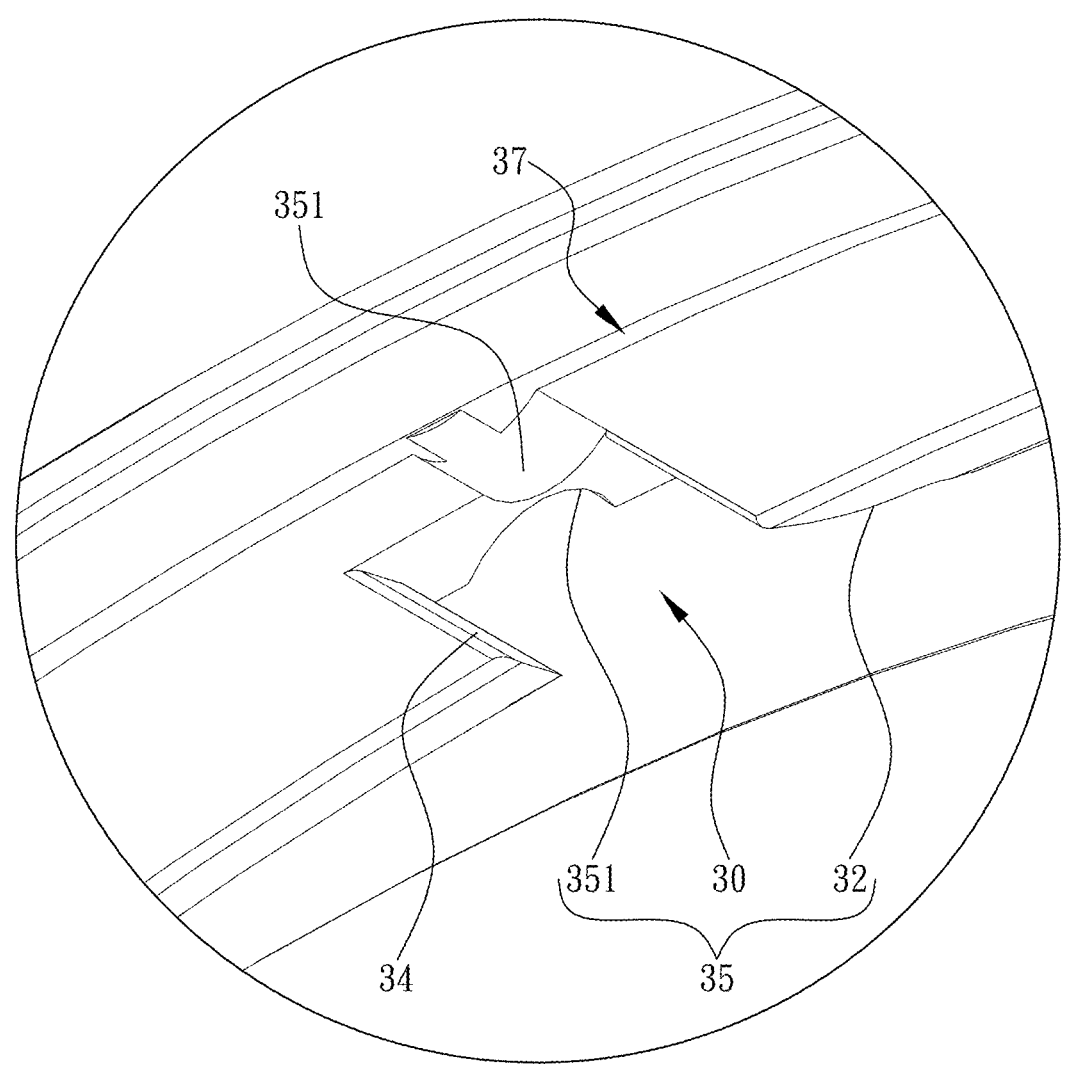
FIG. 11B is a partially enlarged view of a force application portion from another angle according to certain embodiments of the present disclosure.

Referring to FIG. 7 and FIG. 8, in certain embodiments, the outer wall surface of the frame 1 can have at least one fixing portion 20. The fixing portion 20 allows the crushable lens adapter ring A to be fixed to a peripheral object (e.g., a lens hood). The fixing portion 20 includes two plates (but not limited thereto), and the plates are spaced apart by a distance for the screw-in structure of a lens hood to extend in between the plates, so as to achieve the effect of screwed-in engagement or screwed-out disengagement. However, in certain embodiments, according to different types of the peripheral object, the actual structure of the fixing portion 20 can also vary therewith.

In certain embodiments, referring to FIG. 9 to FIG. 11B, the outer periphery surface of the second adapter end D2 of the frame 1 has a through opening 30. The through opening 30 has an opening diameter G1 on the outer wall surface (outer periphery surface) of the frame 1 and an opening diameter G2 on the inner wall surface (inner periphery surface) of the frame 1, and the opening diameter G1 is less than the opening diameter G2, forming an inclined force application surface 32. The through opening 30 and the inclined force application surface 32 jointly form a force application portion 35. In addition, a crushable portion 37 is concavely formed at the outer periphery surface of the second adapter end D2 and extends along the circumferential direction of the frame 1. However, the present disclosure is not limited thereto. In certain embodiments, the crushable portion 37 can be concavely formed at the inner periphery surface of the second adapter end D2, or the outer periphery surface and the inner periphery surface of the second adapter end D2 are concavely formed with a crushable portion 37. Moreover, a portion of the crushable portion 37 can be adjacent to the force application portion 35. When a user holds a removal tool and inserts it with a slanting angle into the through opening 30, and the inclined force application surface 32 is abutted thereby, he or she can apply a force to the inclined force application surface 32 (which is equivalent to applying a force to the force application portion 35). In certain embodiments, the force application portion 35 has an inclined supporting surface 34 at a position opposite to the inclined force application surface 32 (but not limited thereto). The removal tool may abut the inclined supporting surface 34 and use the inclined supporting surface 34 as a fulcrum to apply a force to the inclined force application surface 32. Further, when the force application portion 35 is subjected to an applied force and displaced in a direction (e.g., toward the outside of the circumferential direction), a portion of the crushable portion 37 that is adjacent to the force application portion 35 will be deformed and broken first; afterwards, the user can pull the force application portion 35 and tear the frame 1 along the extension direction of the crushable portion 37. Accordingly, when the crushable lens adapter ring A is erroneously engaged with the second lens F in FIG. 1, the user can break the connection relationship between the crushable lens adapter ring A and the second lens F through the force application portion 35 and the crushable portion 37 to prevent damage to the second lens F.

To increase and accelerate the deformation and breakage of the force application portion 35 and the crushable portion 37, referring to FIG. 9 to FIG. 11B, in certain embodiments, the force application portion 35 can be further provided with at least one sunken area 351. The sunken area 351 can be in communication with the crushable portion 37, and the thickness of the sunken area 351 can be the same as or less than the thickness of the crushable portion 37. Referring to FIG. 11A, the force application portion 35 has two sunken areas 351, one of the sunken areas 351 is concavely formed in an inward direction on the outer periphery surface of the frame 1, and the other sunken area 351 is concavely formed in an outward direction on the inner periphery surface of the frame 1. However, the present disclosure is not limited thereto, and in certain embodiments, the force application portion 35 can have only one sunken area 351, which can be concavely formed on the outer periphery surface or the inner periphery surface. In addition, when the crushable portion 37 and the sunken area 351 are sunken in different directions, for example, the crushable portion 37 is concavely formed in an inward direction on the outer periphery surface of the frame 1 and the sunken area 351 is concavely formed in an outward direction on the inner periphery surface of the frame 1, the sunken area 351, event though not being in communication with the crushable portion 37, can have a position adjacent to the crushable portion 37 so as to achieve the effect of stress concentration when the force application portion 35 is subjected to an applied force, making it easier for a breaking point to start forming in the sunken area 351 and then extend to the crushable portion 37, thereby forcing the crushable portion 37 to deform and break.

Referring to FIG. 9 to FIG. 11B, the frame 1 can be further protrudingly provided with at least one decorative block 38 that extends outward. In certain embodiments, the decorative block 38 is annularly provided on the frame 1 and extends along the circumferential direction. The decorative block 38 can be located between the first connecting portion 11 and the crushable portion 37 and can be coated with a reflective material or a pigment, covered with a metal material, an anti-slip structure such as a toothed pattern, etc., thereby adding to the diversity of the exterior of the crushable lens adapter ring A. In addition, the outer periphery surface of the second adapter end D2 of the frame 1 can be provided with at least one anti-slip portion 39. The anti-slip portion 39 can have structures sufficient to form a rough surface, such as dents, a protruding pattern, granular structures, etc., so as to increase the friction of the frame 1 when it is held and rotated. Accordingly, through the design of the anti-slip portion 39, a user can hold the frame 1 more stably, so as to connect the crushable lens adapter ring A to, or separate the crushable lens adapter ring A from, the first lens L or the second lens F.

Figure 12:
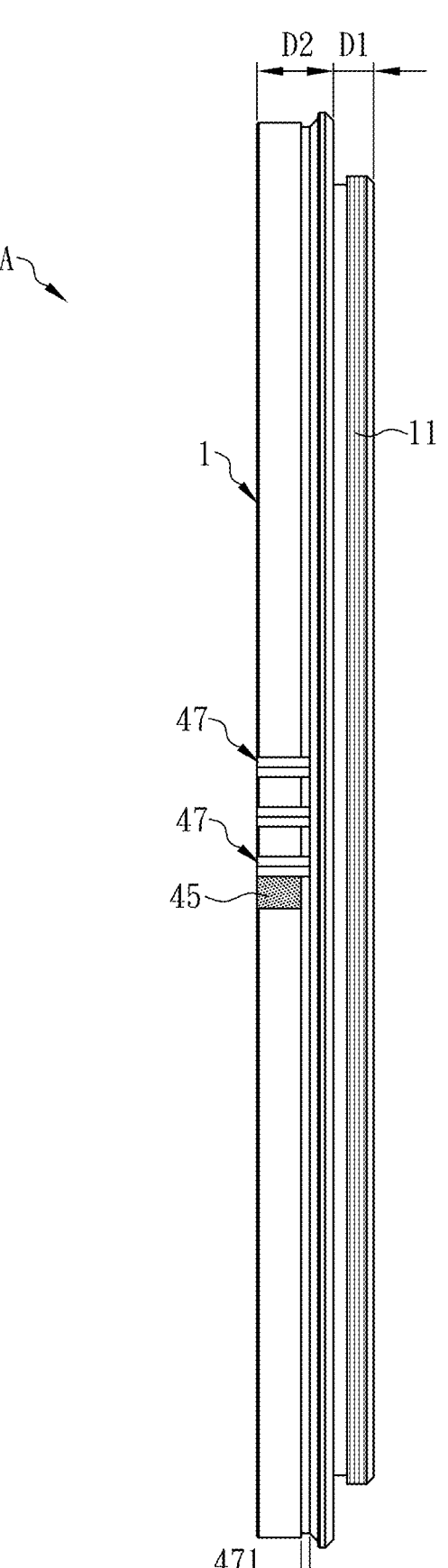
FIG. 12 is a side view of a crushable lens adapter ring according to certain embodiments of the present disclosure.
Figure 13:
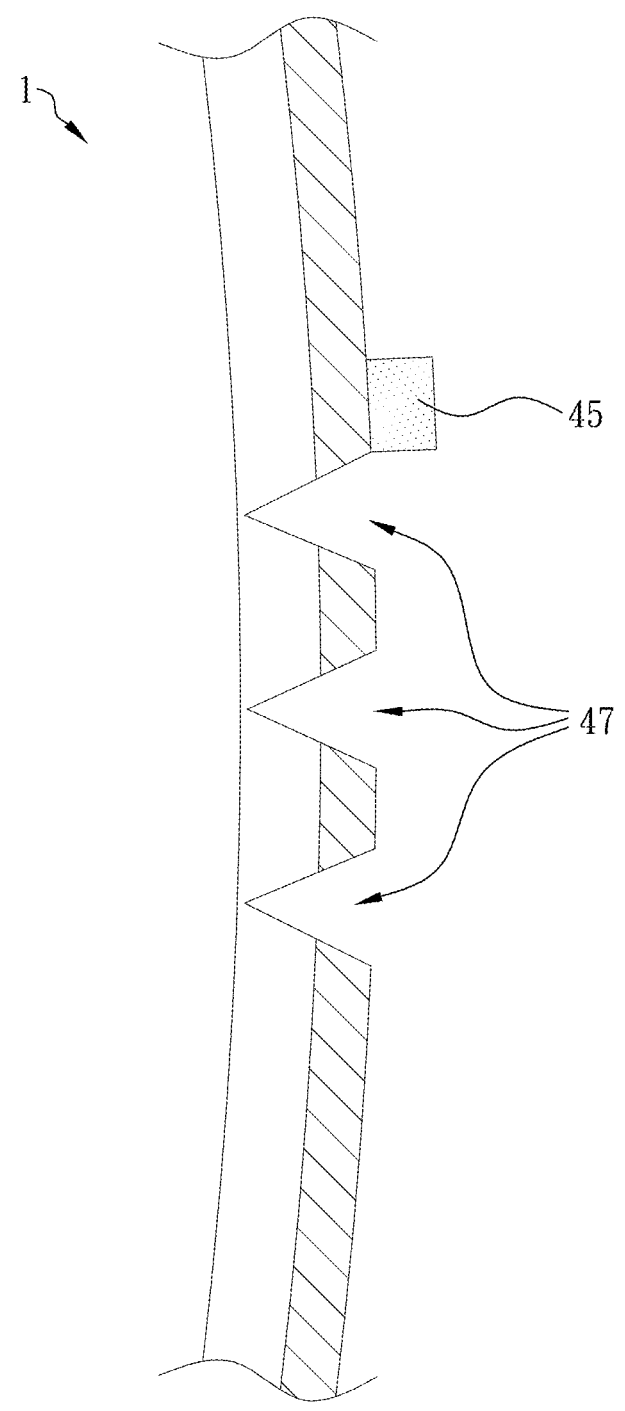
FIG. 13 is a partially enlarged view of a force application portion and crushable portions according to certain embodiments of the present disclosure.
Figure 14:
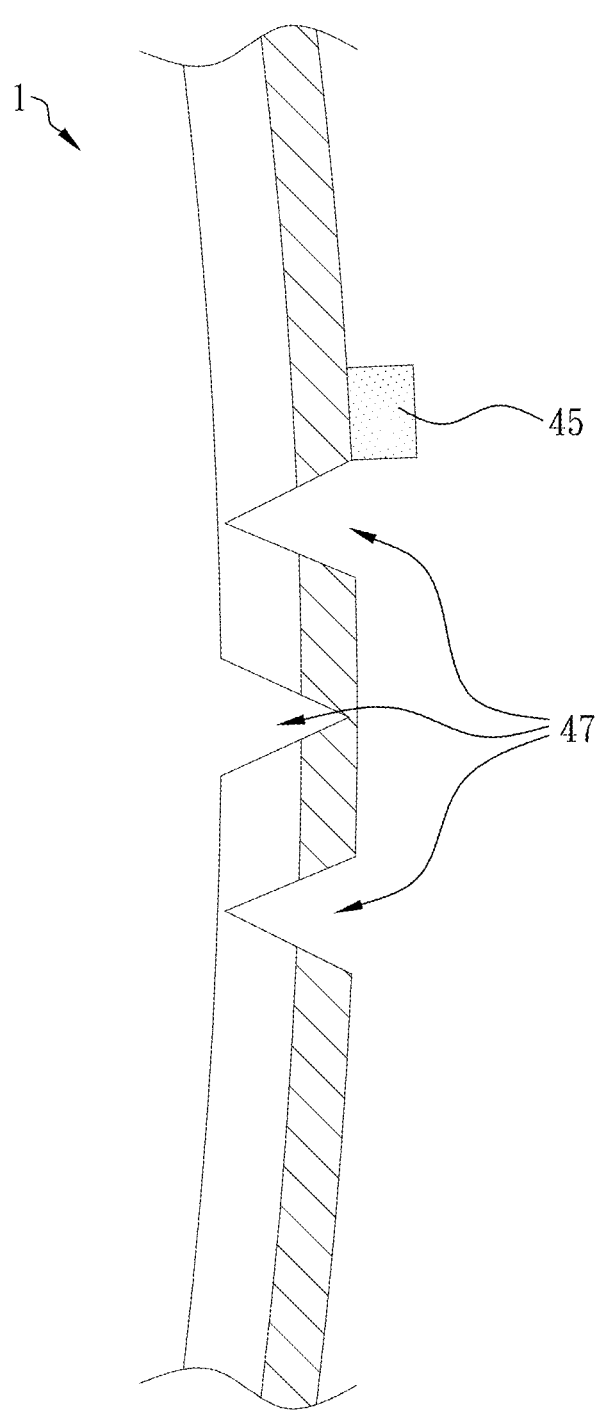
FIG. 14 is a partially enlarged view of a force application portion and crushable portions according to certain embodiments of the present disclosure.

In certain embodiments, referring to FIG. 12 to FIG. 13, the frame 1 is provided with a force application portion 45, a plurality of crushable portions 47, and an auxiliary crushable portion 471. The force application portion 45 is at least one protruding block. Each of the crushable portions 47 can be concavely formed in an inward direction on the outer wall surface (outer periphery surface) of the frame 1 and have a V-shaped cross-sectional shape (but not limited thereto, and in certain embodiments the cross-sectional shape can be a U shape, a W shape, etc.), and at least one of the crushable portions 47 is adjacent to the force application portion 45. In addition, the auxiliary crushable portion 471 is annularly provided along the circumferential direction of the frame 1 (e.g., the configuration of the crushable portion 37 in FIG. 11B) and is adjacent to each of the crushable portions 47. The auxiliary crushable portion 471 can be concavely formed on the outer wall surface (outer periphery surface) or the inner wall surface (inner periphery surface) of the frame 1. When the force application portion 45 is exerted with a force, the frame 1 can be forced to deform and break sequentially along the extension directions of the crushable portions 47 and of the auxiliary crushable portion 471. In certain embodiments, the crushable portions 47 can be concavely formed in an outward direction on the inner wall surface (inner periphery surface) of the frame 1, such as the crushable portion 47 in FIG. 14 that is located in the middle. In addition, in certain embodiments, a manufacturer can, depending on product requirements, adjust the numbers and arrangements of the crushable portions 47 and of the auxiliary crushable portion 471. For example, each of the crushable portions 47 and the auxiliary crushable portion 471 can be concavely formed in an outward direction on the inner wall surface (inner periphery surface) of the frame 1 to maintain the integrity of the exterior of the frame 1. Or, in certain embodiments, the crushable portions 47 can be arranged along the circumferential direction and when viewed from FIG. 12, the crushable portions 47 are arranged along a top-bottom direction. However, in certain embodiments, the crushable portions 47 can be arranged along the axial direction, that is, the crushable portions 47 can be reduced in size and arranged along the left-right direction in FIG. 12.

Figure 15A:
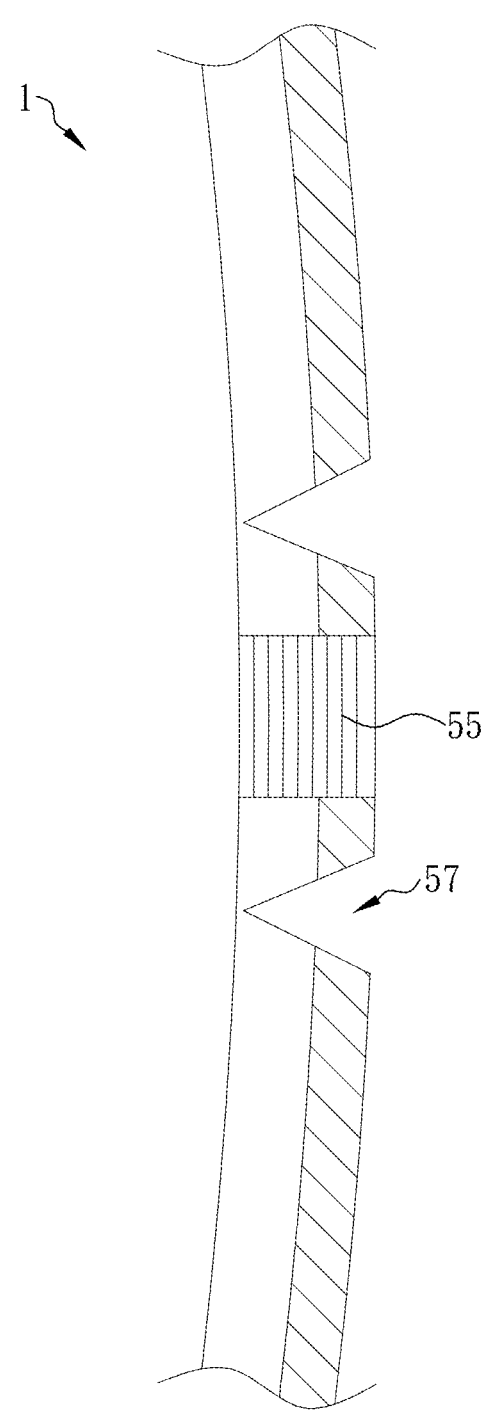
FIG. 15A is a cross-section partial view of a force application portion and crushable portions according to certain embodiments of the present disclosure.
Figure 15B:
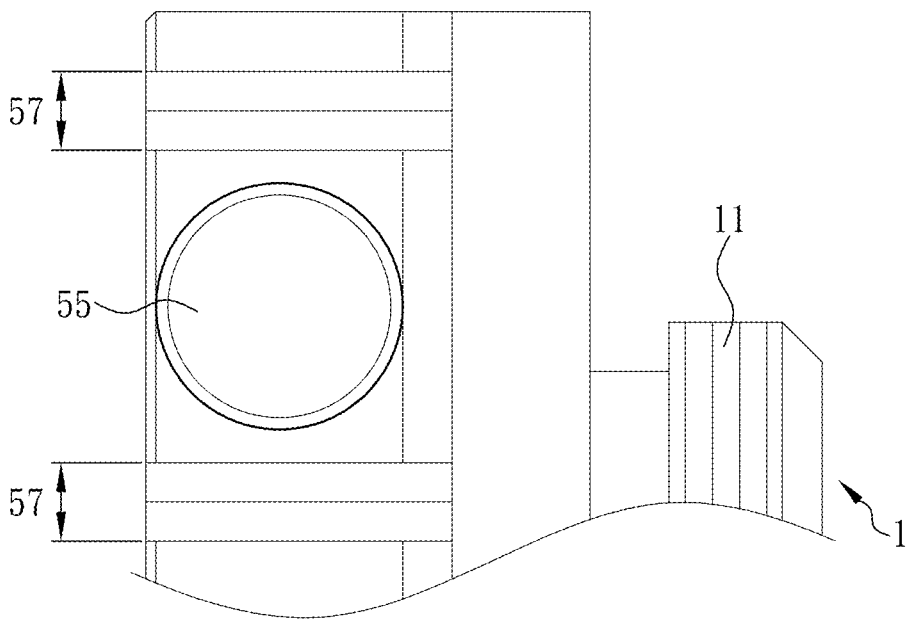
FIG. 15B is a partially enlarged view of a force application portion and crushable portions according to certain embodiments of the present disclosure.

In certain embodiments, referring to FIG. 15A to FIG. 15B, the force application portion 55 can be configured as an internally threaded groove or a threaded hole for a threaded tool (e.g., a screw or a screwdriver) to be locked therein, and the two crushable portions 57 are located at two opposite lateral positions of the force application portion 55 (but not limited thereto). After locking the threaded tool into the force application portion 55, a user can apply a force to the force application portion 55 through the threaded tool so that the force application portion 55 is displaced in a direction, thereby deforming and breaking at least one of the crushable portions 57 to damage the circularity of the frame 1. In certain embodiments, the frame 1 can be further provided with an auxiliary crushable portion (not shown in the figure) for a user to be able to tear the frame 1 along the auxiliary crushable portion; or, the force application portion 55 can be equipped with the crushable portion 37 and the sunken area 351 in FIG. 11B (e.g., at least one end of the internally threaded groove or threaded hole being provided with an outward-facing sunken area) or with only the crushable portion 37. Once a user locks the threaded tool in the force application portion 55, an effect of vulnerability, crush and break can be produced thanks to the smaller thickness of the crushable portion 37 and/or the sunken area 351.

Figure 16:
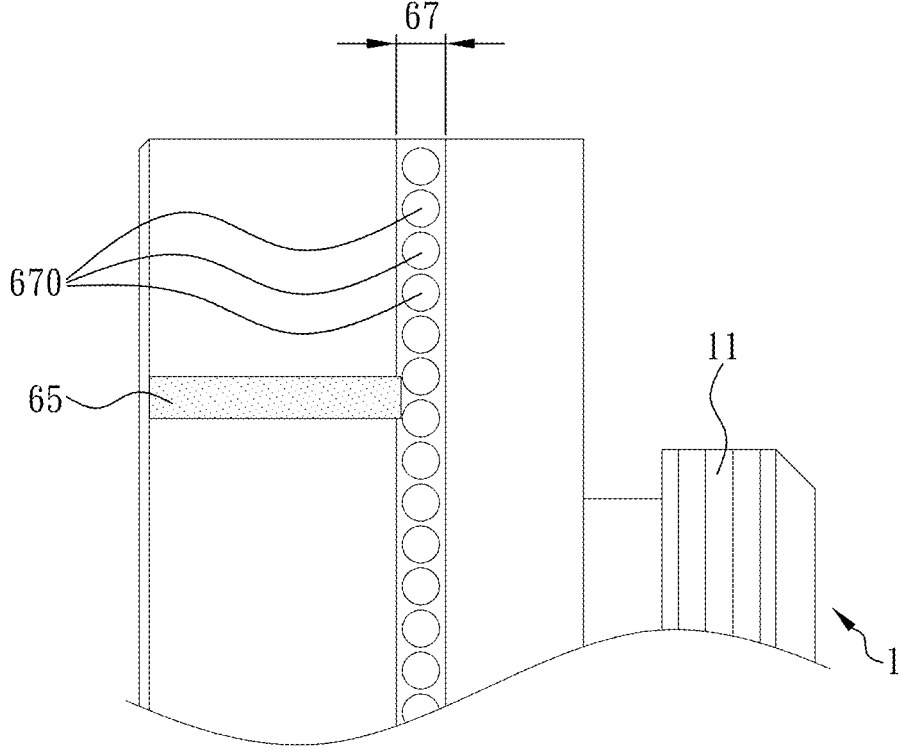
FIG. 16 is a partially enlarged view of a force application portion and a crushable portion according to certain embodiments of the present disclosure.

In certain embodiments, referring to FIG. 16, the crushable portion 67 includes a plurality of holes 670, and the holes 670 are arranged along the circumferential direction of the frame 1. The shortest distance between each two adjacent holes 670 can be 0.1 mm to 0.3 mm (but not limited thereto). Accordingly, when a user applies a force to the force application portion 65 (e.g., a protruding block) barehanded and thereby pushes the force application portion 65 to move along a direction outward of the frame 1, the hole walls of the adjacent holes 670 adjacent to the force application portion 65 will be crushed because of their smaller thickness, thereby making the frame 1 to be broken and torn along the extension direction of the crushable portion 67 (i.e., the direction along which the holes 670 are arranged). However, in certain embodiments, the holes 670 can be arranged along the axial direction of the frame 1 (e.g., the left-right direction in FIG. 16), and breaking effect described above for the frame 1 can also be achieved.

Figure 17:
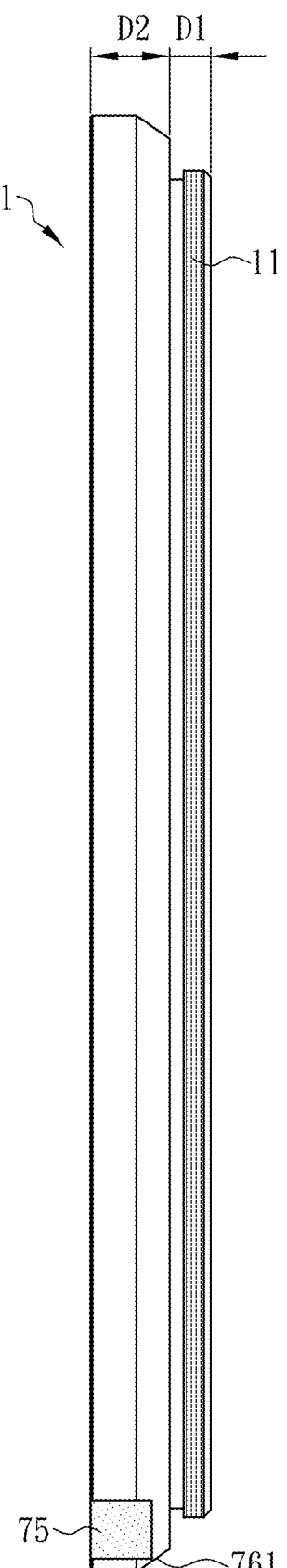
FIG. 17 is a side view of a crushable lens adapter ring according to certain embodiments of the present disclosure.
Figure 18:
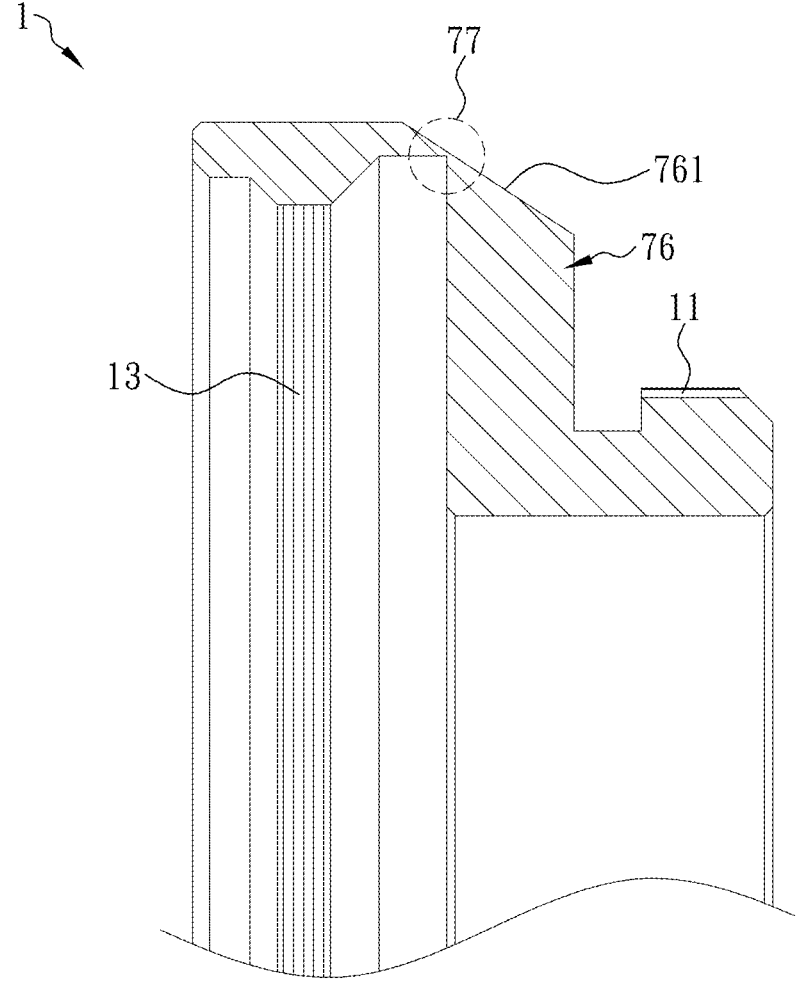
FIG. 18 is a cross-section partial view of a crushable lens adapter ring according to certain embodiments of the present disclosure.

In certain embodiments, referring to FIG. 17 to FIG. 18, as the second adapter end D2 of the frame 1 is larger than the first adapter end D1, a shoulder portion 76 is formed between the second adapter end D2 and the first adapter end D1, and the outer side of the shoulder portion 76 has an inclined surface 761. The inclined surface 761 slopes in a direction from the second adapter end D2 to the first adapter end D1, In addition, a portion of the inclined surface 761 can correspond to the area where the two inner wall surfaces of the second adapter end D2 are joined. The thickness of this area is smaller than the other area, thereby forming a crushable portion 77 (as indicated by the dashed-line circle in FIG. 18). Accordingly, when a user applies a force to the force application portion 75, which is adjacent to the crushable portion 77, the force transmitted from the force application portion 75 to the frame 1 will make the crushable portion 77 (especially the portion corresponding to the aforesaid area where the two inner walls are joined) deform and break due to an excessive stress such that the frame 1 is broken and torn along the extension direction of the crushable portion 77.

Figure 19:
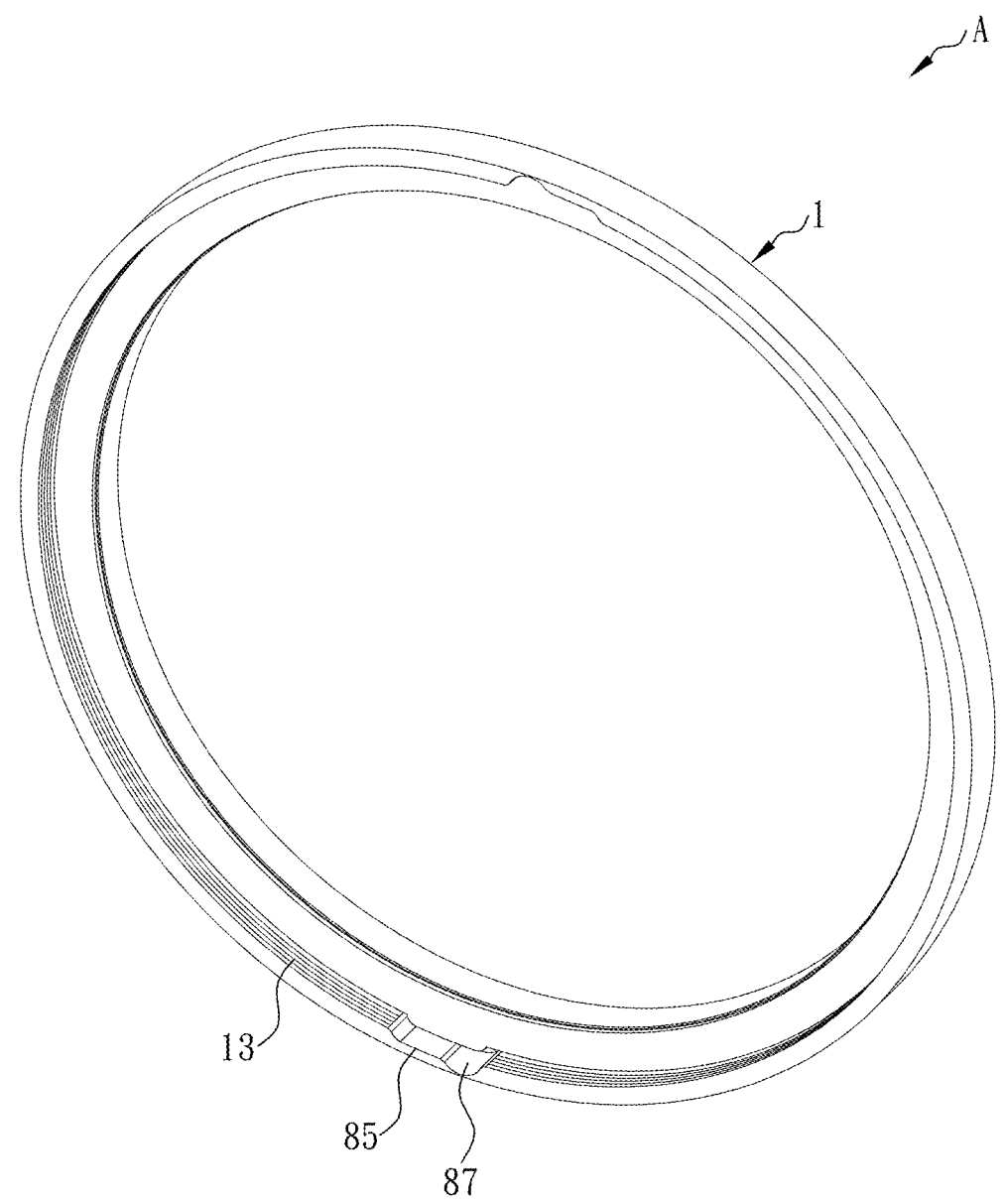
FIG. 19 is a perspective front view of a crushable lens adapter ring according to certain embodiments of the present disclosure.

In certain embodiments, referring to FIG. 19, the inner wall surface (inner periphery surface) of the frame 1 is concavely formed with a force application portion 85 sunken in an outward direction (equivalent to the force application portion 85 being a sunken area) and a crushable portion 87 sunken in an outward direction. The sunken depth of the crushable portion 87 is greater than that of the force application portion 85. When the second lens F in FIG. 1 is locked to the frame 1, an exposed gap will be formed between the force application portion 85 and the crushable portion 87 and the second lens F. A user can insert a removal tool (e.g., a flat-head screwdriver) into the gap and push outward by applying a force, thereby deforming and breaking the crushable portion 87. It is noted that in the foregoing structure, the force application portion 85 and the crushable portion 87 may be integrated into a single unit. In other words, there is no limitation that the removal tool can only be put into the force application portion 85 in order to carry out force application. The removal tool may also be moved to a position corresponding to the crushable portion 87 in order to carry out force application. In that case, the crushable portion 87 functions both as the force application portion 85 and the crushable portion 87. Moreover, the frame 1 may also have the auxiliary crushable portion 471 in FIG. 12, so that the frame 1 can be broken and torn sequentially along the extension directions of the crushable portion 87 and of the auxiliary crushable portion 471.

In summary of the above, referring to FIGS. 1-19, the crushable lens adapter ring A in the present disclosure has the thickness of the frame 1 reduced to deal with improper engagement. A user only has to apply an external force to the force application portion(s) 15, 25, 35, 45, 55, 65, 75, 85, so as to produce a tearing and breaking effect on the crushable portion(s) 17, 27, 37, 47, 57, 67, 77, 87, and the second lens F can be easily separated from the frame 1, greatly improving on the problem that a conventional adapter ring is difficult to break with an external force. Also, the breakage can be carried out either barehanded or with a removal tool (including a threaded tool) so that a user can use the crushable lens adapter ring A of the present invention in both outdoor and indoor photographing environments without having to worry about an adapter ring being unable to be broken leading to the problem that a lens improperly engaged cannot be removed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A crushable lens adapter ring, comprising:
a frame, having:
    a first end, wherein an outer wall surface of the first end has a first connecting portion for being connected to a first lens having a first diameter;
    a second end, wherein an inner wall surface of the second end has a second connecting portion for being connected to a second lens having a second diameter;
    at least one crushable portion; and
    at least one force application portion having at least one portion adjacent to at least one portion of the at least one crushable portion and configured to, when subjected to a force and displaced in a direction, force the frame to be broken and torn along an extension direction of the at least one crushable portion.

2. The crushable lens adapter ring according to claim 1, wherein the at least one crushable portion extends along an axial direction of the frame.

3. The crushable lens adapter ring according to claim 1, wherein the at least one crushable portion extends along a circumferential direction of the frame.

4. The crushable lens adapter ring according to claim 1, wherein the at least one crushable portion is shaped as a groove and concavely formed at an outer wall surface or an inner wall surface of the frame.

5. The crushable lens adapter ring according to claim 1, wherein the at least one crushable portion includes a plurality of holes.

6. The crushable lens adapter ring according to claim 1, wherein an outer diameter of the second end is greater than an outer diameter of the first end so as to form a shoulder portion between the first end and the second end, an outer side of the shoulder portion has an inclined surface, and the inclined surface slopes in a direction from the second end to the first end so that a portion of the shoulder portion that corresponds to an area where two inner wall surfaces of the second end are joined forms the at least one crushable portion.

7. The crushable lens adapter ring according to claim 1, wherein a minimal thickness of the at least one crushable portion is 0.1 mm to 0.3 mm.

8. The crushable lens adapter ring according to claim 1, wherein the frame further has at least one auxiliary crushable portion adjacent to the at least one crushable portion.

9. The crushable lens adapter ring according to claim 1, wherein the at least one force application portion is protrudingly provided on an outer wall surface of the frame.

10. The crushable lens adapter ring according to claim 1, wherein the at least one force application portion includes a through opening and an inclined force application surface, and an opening diameter of the through opening on an outer wall surface of the frame is less than an opening diameter of the through opening on an inner wall surface of the frame so as to form the inclined force application surface.

11. The crushable lens adapter ring according to claim 1, wherein the at least one force application portion is an internally threaded groove or a threaded hole.

12. The crushable lens adapter ring according to claim 1, wherein the frame is made of a metal material or a fiber-reinforced plastic material.

13. The crushable lens adapter ring according to claim 1, wherein the at least one force application portion includes at least one sunken area, and the sunken area is adjacent to or in communication with the at least one crushable portion.

14. The crushable lens adapter ring according to claim 13, wherein the at least one sunken area is located at at least one of an outer wall surface and an inner wall surface of the frame.

\* \* \* \* \*